US011330665B2

United States Patent
Jain et al.

(10) Patent No.: US 11,330,665 B2
(45) Date of Patent: May 10, 2022

(54) INCREASING THROUGHPUT EFFICIENCY IN A PDCP CHANNEL WITH ROHC TCP PROFILE

(71) Applicant: QUALCOMM Incorporated, San Diego, CA (US)

(72) Inventors: Rahul Jain, Sawai Madhopur (IN); Deepak Sah, Hyderabad (IN); Ganesh Babu Kamma, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 16/738,132

(22) Filed: Jan. 9, 2020

(65) Prior Publication Data

US 2021/0219380 A1 Jul. 15, 2021

(51) Int. Cl.
*H04W 80/06* (2009.01)
*H04L 69/04* (2022.01)
*H04L 69/16* (2022.01)
*H04L 69/22* (2022.01)
(Continued)

(52) U.S. Cl.
CPC ............ *H04W 80/06* (2013.01); *H04L 69/04* (2013.01); *H04L 69/161* (2013.01); *H04L 69/22* (2013.01); *H04W 28/06* (2013.01); *H04W 80/08* (2013.01)

(58) Field of Classification Search
None
See application file for complete search history.

(56) References Cited

U.S. PATENT DOCUMENTS 7,046,672 B2 * 5/2006 Liao .................. H04L 47/10
370/395.1
7,907,609 B2 3/2011 Kapoor et al.
8,392,616 B2 3/2013 Huang et al.
(Continued)

FOREIGN PATENT DOCUMENTS

EP 1974528 B1 * 3/2017 ....... H04L 29/06027
JP 2002204260 A 7/2002
(Continued)

OTHER PUBLICATIONS

West et al. "TCP/IP Field Behavior" RFC 4413, published Mar. 2006, retrieved from https://datatracker.ietf.org/doc/html/rfc4413. (Year: 2006).*
(Continued)

*Primary Examiner* — Jamaal Henson
(74) *Attorney, Agent, or Firm* — The Marbury Law Group, PLLC

(57) ABSTRACT

Various aspects include methods for Transmission Control Protocol (TCP)/Internet Protocol (IP) (TCP/IP) packet transmission and compression of headers for TCP/IP packet transmission. Various embodiments may include a packet data convergence protocol (PDCP) layer of a processing device applying least significant bit (LSB) encoding to a TCP Timestamp (TS) option of a TCP/IP packet using an offset parameter of zero to generate a compressed header in response to determining that a TCP TS field of the TCP/IP packet and a TCP TS field of a last TCP/IP packet transmitted have a same value. In some embodiments, a Timestamp Value (TSVal) field or a Timestamp Echo Reply (TSEcho) field of the TCP TS option of the compressed header may have a size of one byte.

24 Claims, 6 Drawing Sheets

(51) Int. Cl.
*H04W 28/06* (2009.01)
*H04W 80/08* (2009.01)

(56) References Cited

U.S. PATENT DOCUMENTS

| | | | |
|---|---|---|---|
| 8,804,765 B2 | 8/2014 | Pelletier et al. | |
| 2002/0097722 A1* | 7/2002 | Liao | H04L 47/37 370/392 |
| 2004/0165527 A1* | 8/2004 | Gu | H04L 65/608 370/229 |
| 2004/0264433 A1* | 12/2004 | Melpignano | H04L 69/04 370/349 |
| 2005/0163098 A1* | 7/2005 | Liao | H04L 47/10 370/349 |
| 2007/0058679 A1* | 3/2007 | Pelletier | H04L 69/04 370/477 |
| 2009/0232093 A1* | 9/2009 | Lecompte | H04L 69/22 370/477 |
| 2010/0208798 A1* | 8/2010 | Melpignano | H04N 19/503 375/240.07 |
| 2011/0145581 A1* | 6/2011 | Malhotra | H04N 21/43615 713/171 |
| 2012/0189023 A1* | 7/2012 | Huang | H04L 1/0006 370/477 |
| 2015/0016320 A1* | 1/2015 | Pelletier | H04W 28/06 370/310 |
| 2018/0227219 A1 | 8/2018 | Zhang et al. | |
| 2020/0100141 A1* | 3/2020 | Wu | H04L 69/04 |

FOREIGN PATENT DOCUMENTS

| | | | | |
|---|---|---|---|---|
| WO | WO-0228107 A2 * | 4/2002 | | H03M 7/30 |
| WO | 2007112140 A2 | 10/2007 | | |
| WO | 2018171328 A1 | 9/2018 | | |

OTHER PUBLICATIONS

Bormann et al. "Robust Header Compression (ROHC): Framework and Four Profiles: RTP, UDP, ESP, and Uncompressed" RFC 3095 published Jul. 2001, https://datatracker.ietf.org/doc/html/rfc3095#section-4.5.1 (Year: 2001).*
Pelletier et al. "Robust Header Compression (ROHC): A Profile for TCP/IP (ROHC-TCP)" RFC 6846 published Jan. 2013, and retrieved on Oct. 16, 2021 form https://datatracker.ietf.org/doc/html/rfc6846 (Year: 2013).*
Degermark M, et al. "IP Header Compression", RFC 2507, Published Feb. 1999, Network Working Group, 47 pages, submitted in an IDS (Year: 1999).*
Bormann C., et al., "RObust Header Compression (ROHC): Framework and Four Profiles: RTP, UDP, ESP, and Uncompressed; rfc3095.txt", 5. JCT-VC Meeting, 96. MPEG Meeting, Mar. 16, 2011-Mar. 23, 2011, Geneva, (Joint Collaborative Team on Video Coding of ISO/IEC JTC1/SC29/WG11 and ITU-T SG.16), URL: http://wftp3.itu.int/av-arch/jctvc-site/, Internet Engineering Task Force, IETF, CH, Jul. 1, 2001 (Jul. 1, 2001), XP015008878, pp. 1-168, ISSN 0000-0003.
International Search Report and Written Opinion—PCT/US2021/012419—ISA/EPO—dated Mar. 29, 2021. 16 pages.
Zhang Q., et al., "TCP/IP Header Compression for ROHC (ROHC-TCP), draft-ietf-rohc-tcp-00.txt", TCP/IP Header Compression for ROHC (ROHC-TCP), Draft-IETF-ROHC-TCP-00. TXT, Internet Engineering Task Force, IETF, Standard working draft, Internet Society (ISOC) 4, Rue Des Falaises CH-1205 Geneva, Switzerland, vol. rohc, Jan. 1, 2001 (Jan. 1, 2001), XP015026779, pp. 1-65.
Degermark M., et al., "IP Header Compression", RFC 2507, Published Feb. 1999, Network Working Group, 47 Pages, https://datatracker.ietf.org/doc/html/rfc2507.html.

* cited by examiner

INCREASING THROUGHPUT EFFICIENCY IN A PDCP CHANNEL WITH ROHC TCP PROFILE

BACKGROUND

Long Term Evolution (LTE), fifth generation (5G) new radio (NR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

SUMMARY

Various aspects include methods for Transmission Control Protocol (TCP)/Internet Protocol (IP) (TCP/IP) packet transmission. In various aspects, the methods may be performed by a packet data convergence protocol (PDCP) layer of a processing device within a computing device. In various aspects, the methods may include applying least significant bit (LSB) encoding to a TCP Timestamp (TS) option of a TCP/IP packet using an offset parameter of zero to generate a compressed header in response to determining that a TCP TS field of the TCP/IP packet and a TCP TS field of a last TCP/IP packet transmitted have a same value, wherein a Timestamp Value (TSVal) field or a Timestamp Echo Reply (TSEcho) field of the TCP TS option of the compressed header has a size of one byte, and transmitting the TCP/IP packet using the compressed header. Various aspects may further include determining whether any of the TCP TS fields of the TCP/IP packet and the TCP TS fields of the last TCP/IP packet transmitted are the same, and determining that a TCP TS field of the TCP/IP packet and a TCP TS field of a last TCP/IP packet transmitted have a same value in response to determining that the TCP TS field of the TCP/IP packet and the TCP TS field of the last TCP/IP packet transmitted are the same. In some aspects, determining whether any of the TCP TS fields of the TCP/IP packet and the TCP TS fields of the last TCP/IP packet transmitted are the same may be based at least in part on whether a TSVal field of the TCP/IP packet and a TSVal field of the last TCP/IP packet are the same. In some aspects, determining whether any of the TCP TS fields of the TCP/IP packet and the TCP TS fields of the last TCP/IP packet transmitted are the same may be based at least in part on whether a TSEcho field of the TCP/IP packet and a TSEcho field of the last TCP/IP packet are the same. In some aspects, the TSVal field of the TCP TS option of the compressed header may have the size of one byte. In some aspects, the TSEcho field of the TCP TS option of the compressed header may have the size of one byte.

Further aspects may include an apparatus, such as a computing device, having a processing device configured to perform one or more operations of any of the methods summarized above. Further aspects may include a non-transitory processor-readable storage medium having stored thereon processor-executable instructions configured to cause a processor of a computing device to perform operations of any of the methods summarized above. Further aspects include an apparatus, such as a computing device, having means for performing functions of any of the methods summarized above. Further aspects include a system on chip processing device for use in a computing device configured to perform one or more operations of any of the methods summarized above. Further aspects include a system in a package processing device that includes two systems on chip for use in a computing device and is configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
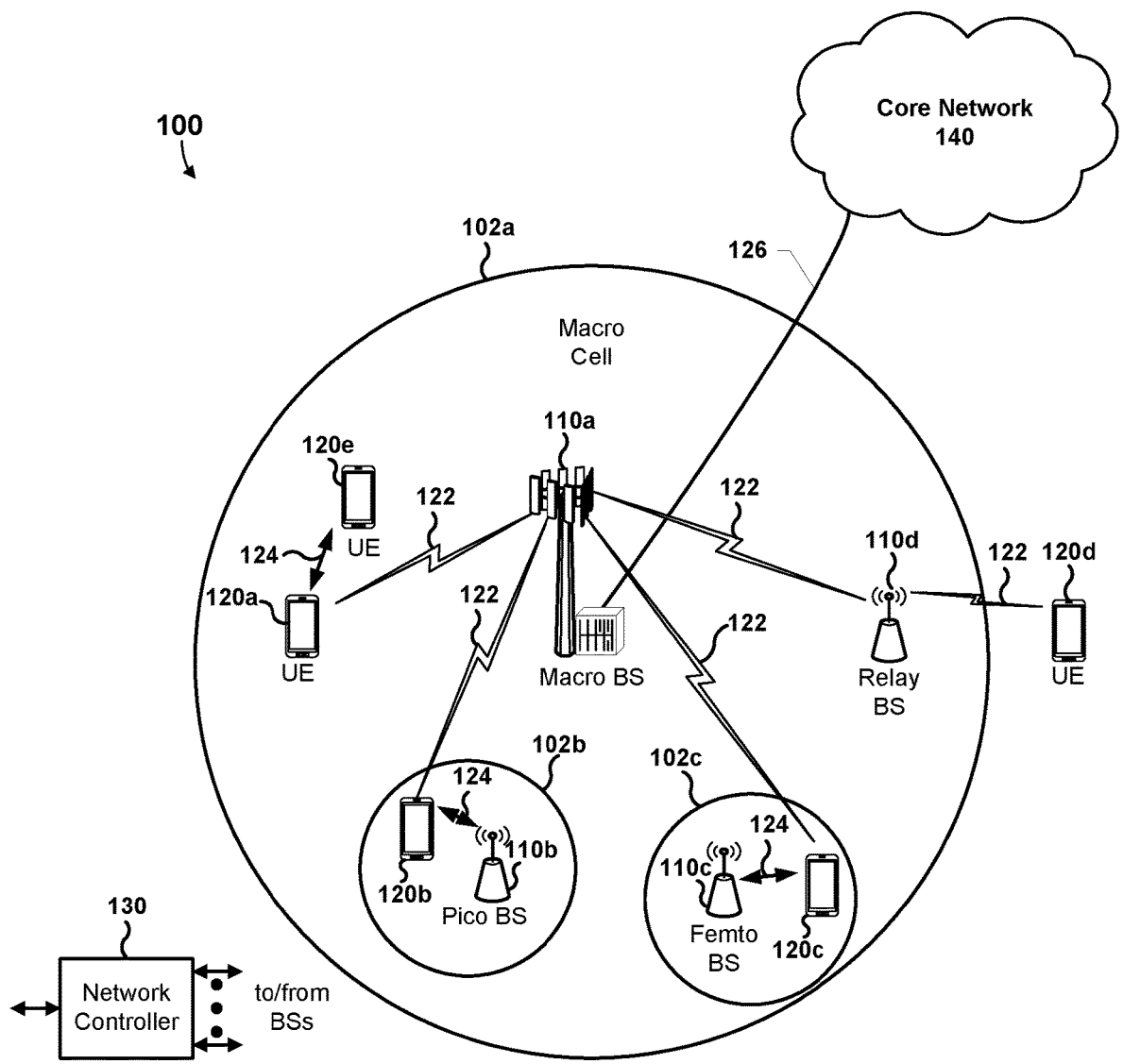
FIG. 1 is a system block diagram conceptually illustrating an example communications system.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "computing device" is used herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, cellular communication network devices, wireless router devices, wireless appliances, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single computing device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multi-core processors, and each processor in an SOC may be referred to as a core. The term "multiprocessor" may be used herein to refer to a system or device that includes two or more processing units configured to read and execute program instructions.

The 3rd Generation Partnership Project (3GPP) defines various protocols that support Internet Protocol (IP) packet transmissions in wireless networks, such as third generation wireless mobile communication technologies (3G) (e.g., global system for mobile communications (GSM) evolution (EDGE) systems, etc.), fourth generation wireless mobile communication technologies (4G) (e.g., long term evolution (LTE) systems, LTE-Advanced systems, etc.), fifth generation wireless mobile communication technologies (5G) (5G New Radio (5G NR) systems, etc.), etc.

In various 3GPP protocols, IP packet transmissions over the air interface, such as transmissions to/from a user equipment (UE) computing device from/to a base station (e.g., cellular IoT (CIoT) base station (C-BS), a NodeB, an evolved NodeB (eNodeB), radio access network (RAN) access node, a radio network controller (RNC), a base station (BS), a macro cell, a macro node, a Home eNB (HeNB), a femto cell, a femto node, a pico node, etc.), are handled by one or more "layer 2" sublayers, such as the packet data convergence protocol (PDCP) layer. The IP packets correspond to various different IP profiles, such as Transmission Control Protocol (TCP)/IP packets, etc. Regardless of the IP profile (e.g., TCP, etc.) of the IP packets, the layer 2 sublayers may support IP transmissions over the air interface by providing compression/decompression services. As an example, the PDCP layer supports IP transmissions over the air interface by providing header compression services for IP packets to be transmitted and header decompression services for IP packets that are received.

One type of header compression that can be applied by a PDCP layer to IP packets is "RObust Header Compression" (ROHC). ROHC supports compression in links with significant error rates and long round-trip times, as well as in links that may be bandwidth-limited. The Internet Engineering Task Force (IETF) Request for Comments (RFC) 6846 defines the ROHC profile for compression of TCP/IP packets. RFC 6846 supports least significant bit (LSB) encoding methods for fields of headers of TCP/IP packets.

The least significant bit (LSB) encoding method compresses a field whose value differs by a small amount from the value stored in the context. The least significant bits of the field value are transmitted instead of the original field value. For example, field=lsb(<num_lsbs_param>, <offset_param>), where "num_lsbs_param" is the number of least significant bits to use, and "offset_param" is the interpretation interval offset or offset parameter. The interpretation interval is a function of a value stored in the context, ref_value, and of num_lsbs_param such that f(context_value, num_lsbs_param)=[ref_value−offset_param, ref_value+(2^num_lsbs_param−1)−offset_param] where offset_param is an integer (or restated, f(v_ref, k)=[v_ref−p, v_ref+(2^k−1)−p]. The LSB encoding method can therefore compress a field whose value lies between the lower and the upper bounds, inclusively, of the interpretation interval. In ROHC LSB encoding, the "offset_param" is sometimes referred to as "p" and the "num_lsbs_param" is sometimes referred to as "k" to simplify the notation.

As per RFC 6846, the TCP Timestamp (TS) option is encoded using least significant bit (LSB) encoding on [8, 16, 24, 32] bits while sending in an irregular chain. The TCP TS option includes the following fields, Kind[=8 bytes], Length [=10 bytes], Timestamp Value (TSVal)[=4 bytes, may vary] and Timestamp Echo Reply (TSEcho)[=4 bytes, may vary]. Both the Timestamp Value (TSVal) field value and the Timestamp Echo Reply (TSEcho) field value are encoded using LSB encoding in the TCP TS option. This compression saves bandwidth and makes the compressor efficient by sending from the transmitting computing device only the required least significant bits and thereby recovering the original timestamp using the context saved at the receiving computing device from the previous packet.

In recent years, network throughput for TCP/IP transmissions has increased. For example, throughput on 5G networks for TCP/IP transmissions is typically higher than the throughput that can be achieved on 3G networks for TCP/IP transmissions. This higher throughput of TCP/IP transmissions has caused some scenarios that were previously unappreciated for TCP/IP transmissions, such as two or more TCP/IP packets having the same timestamps (e.g., two or more TCP/IP packets having the same TCP TS option values, two or more TCP/IP packets having the same TSVal values, two or more TCP/IP packets being the same TSEcho values, etc.).

Currently, RFC 6846 requires window LSB encoding on 8 bits with p=−1 (i.e., offset parameter set to −1) and assumes that TS option fields are strictly increasing. As per current RFC guidelines, when TCP TS option have the same or increasing values as compared to the previous packet compressed or transmitted, the TCP TS option is encoded using 3 bytes (with p=0x40000).

In various embodiments, the offset parameter ("offset_param" or "p") may be set to zero (i.e., p=0 or offset_param=0) for LSB encoding of TSVal fields and/or TSEcho fields of TCP Timestamp option in response to a TCP timestamp (TS) field of the TCP/IP packet and a TCP TS field of a last TCP/IP packet transmitted have a same value, such as during retransmission of TCP/IP packets, during scenarios in which throughput is sufficiently high such that two or more packets are assigned the same timestamp, etc. The selection of p=0 may drive the "num_lsbs_param" (i.e., "k") to be equal to 0 (i.e., k=0) in LSB encoding. When p=0 and k=0, the encoding of the fields of the TCP Timestamp option, i.e., TSVal field and TSEcho, can each be done using only 1 byte in various embodiments. Therefore, in comparison to the current RFC 6846 LSB encoding for transmitted packets on the PDCP layer, at least two to four bytes (i.e., two for TSVal and two for TSEcho) may be saved in the various embodiments because TSVal and/or TSEcho may be encoded using only one byte each.

In various embodiments, a PDCP layer of a transmitting computing device (e.g., a UE computing device, a base station, etc.) may determine whether any TCP Timestamp (TS) field (i.e., TSVal or TSEcho) of the TCP/IP packet and the TCP TS field (i.e., TSVal or TSEcho) of a last TCP/IP packet transmitted remain constant (i.e., have a same value). For example, a TCP TS field of the TCP/IP packet and a TCP TS field of a last TCP/IP packet transmitted may be determined to have the same value when one or both of the TSVal fields or both of the TSEcho fields of the two TCP/IP packets are the same. Determining that any of the TCP TS fields of the TCP/IP packets remain constant may include performing any operations for determining whether the fields are the same, such as comparing the fields themselves, comparing hashes of the fields, subtracting values of the fields from one another such that non-zero results indicate a mismatch, etc.

In various embodiments, in response to determining that any of the TCP TS field (i.e., TSVal or TSEcho) of the TCP/IP packet and a last TCP/IP packet transmitted remain constant (i.e., have a same value), the PDCP layer may apply LSB encoding to the TCP TS option of the TCP/IP packet using an offset parameter of zero (i.e., p=0) to generate a compressed header. For example, if the processor determines that TSval remains constant between TCP/IP packets, the TSval may be compressed into one byte instead of three bytes, whereas if the TSecho is not constant, TSecho will be compressed accordingly. Thus in this example case, the whole TCP TS option is not constant but various embodiments may be used to compress one of the fields. The TCP/IP packet may be transmitted by the PDCP layer using the compressed header. In some circumstances, the TSVal field of the TCP TS option of the compressed header may have a size of one byte. In some circumstances, the TSEcho field of the TCP TS option of the compressed header may have a size of one byte.

In various embodiments, the TCP TS option field sizes (i.e., the size of each of the TSVal and TSEcho fields) may be reduced from three bytes to one byte compared to the requirements of RFC 6846. Specifically, various embodiments may save two bytes per field, thereby making ROHC compression more efficient for TCP/IP packet retransmission on the PDCP layer. Experiments have been conducted comparing the compression according to the requirements of RFC 6846 and LSB encoding according to the various embodiments with an offset parameter of zero (i.e., p=0). In one experiment, a test set of 522 TCP/IP packets streaming on the uplink and downlink were observed with the total number of header bytes, excluding payload bytes of 27,144. Using the LSB encoding requirements of RFC 6846 a total number of compressed header bytes for the test set was 6,127 with a compressor efficiency of 77.43%. Using the LSB encoding according to the various embodiments with an offset parameter of zero (i.e., p=0) a total number of compressed header bytes was 4,245 with a compressor efficiency of 84.36%. Thus, in comparison to the LSB encoding requirements of RFC 6846, the experiment showed that the LSB encoding according to the various embodiments with an offset parameter of zero (i.e., p=0) saved 1,882 bytes and saved approximately 7% bandwidth for TCP/IP packet streaming.

Various embodiments save bandwidth in TCP/IP communications by using least significant bit encoding for the TCP timestamp option, thereby enabling recovery of the original timestamp using the context saved from a previous packet. Thus, various embodiments improve operations of computing devices performing TCP/IP packet transmission by increasing compression efficiency (e.g., up to approximately 7 percent), resulting in better bandwidth utilization.

Various examples are discussed herein with reference to wireless communications and wireless computing devices to better illustrate various aspects of various embodiments. However, the discussions of wireless communications and wireless computing devices are merely examples of types of apparatus that may implement various embodiments, and are not intended to limit the scope of the disclosure or claims. Other types of apparatus, such as wired computing devices, and/or other types of communications, such as wired communications, may be substituted for the wireless communications and wireless devices in the various examples.

FIG. 1 illustrates an example of a communications system 100 that is suitable for implementing various embodiments. The communications system 100 may be an 5G NR network, or any other suitable network such as an LTE network.

The communications system 100 may include a heterogeneous network architecture that includes a core network 140 and a variety of mobile devices (also referred to as user equipment (UE) computing devices) (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with computing devices (mobile devices or UE computing devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The computing device 120a-120e (UE computing device) may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and send a transmission of the data to a downstream station (for example, a wireless device or a base station). A relay station also may be a mobile device that can relay transmissions for other computing devices. In the example illustrated in FIG. 1, a relay station 110d may communicate with macro the base station 110a and the computing device 120d in order to facilitate communication between the base station 110a and the computing device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The computing devices (UE computing devices) 120a, 120b, 120c may be dispersed throughout communications system 100, and each computing device may be stationary or mobile. A computing device also may be referred to as an access terminal, a UE, a terminal, a mobile station, a subscriber unit, a station, etc.

A macro base station 110a may communicate with the communication network 140 over a wired or wireless communication link 126. The computing devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per computing device. Multi-layer transmissions with up to 2 streams per computing device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband Internet of things) devices. A computing device 120a-e may be included inside a housing that houses components of the computing device, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices 120a-e (for example, illustrated as the computing device 120a and the computing device 120e) may communicate directly using one or more sidelink channels 124 (for example, without using a base station 110a-110d as an intermediary to communicate with one another). For example, the computing devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the computing device 120a-e may perform scheduling operations, resource selection operations, as well as other operations described elsewhere herein as being performed by the base station 110a.

Figure 2:
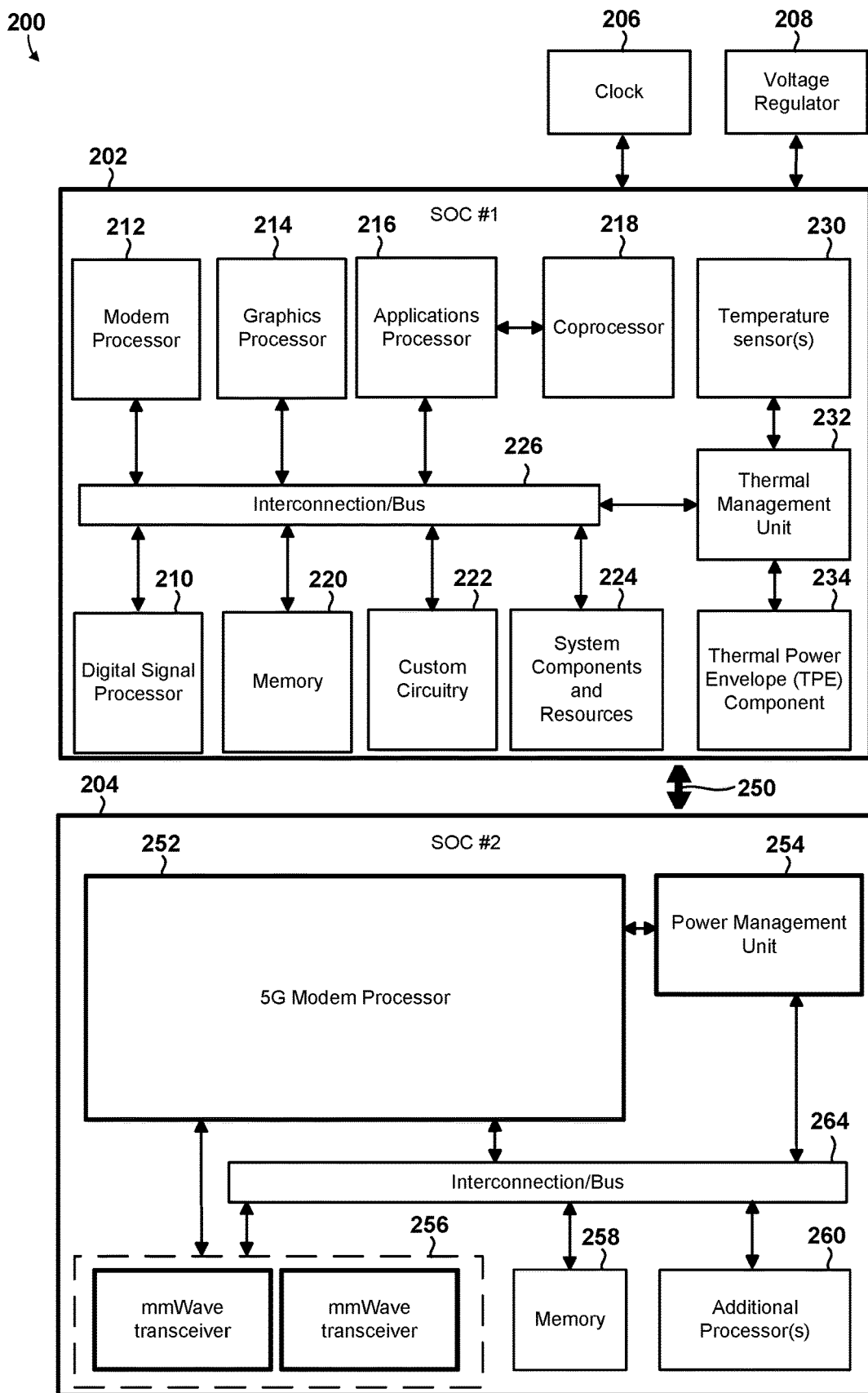
FIG. 2 is a component block diagram illustrating a computing system that may be configured to implement TCP/IP packet transmission in accordance with various embodiments.

Various embodiments may be implemented on a number of single processor and multiprocessor processing devices, including a system-on-chip (SOC) or system in a package (SIP), which may be use in a variety of computing devices. FIG. 2 illustrates an example processing device or SIP 200 architecture that may implement various embodiments and be used in computing devices (UE computing devices) implementing the various embodiments.

With reference to FIGS. 1 and 2, the illustrated example SIP 200 includes a two SOCs 202, 204, a clock 206, and a voltage regulator 208. In some embodiments, the first SOC 202 operate as central processing unit (CPU) of the computing device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a computing device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
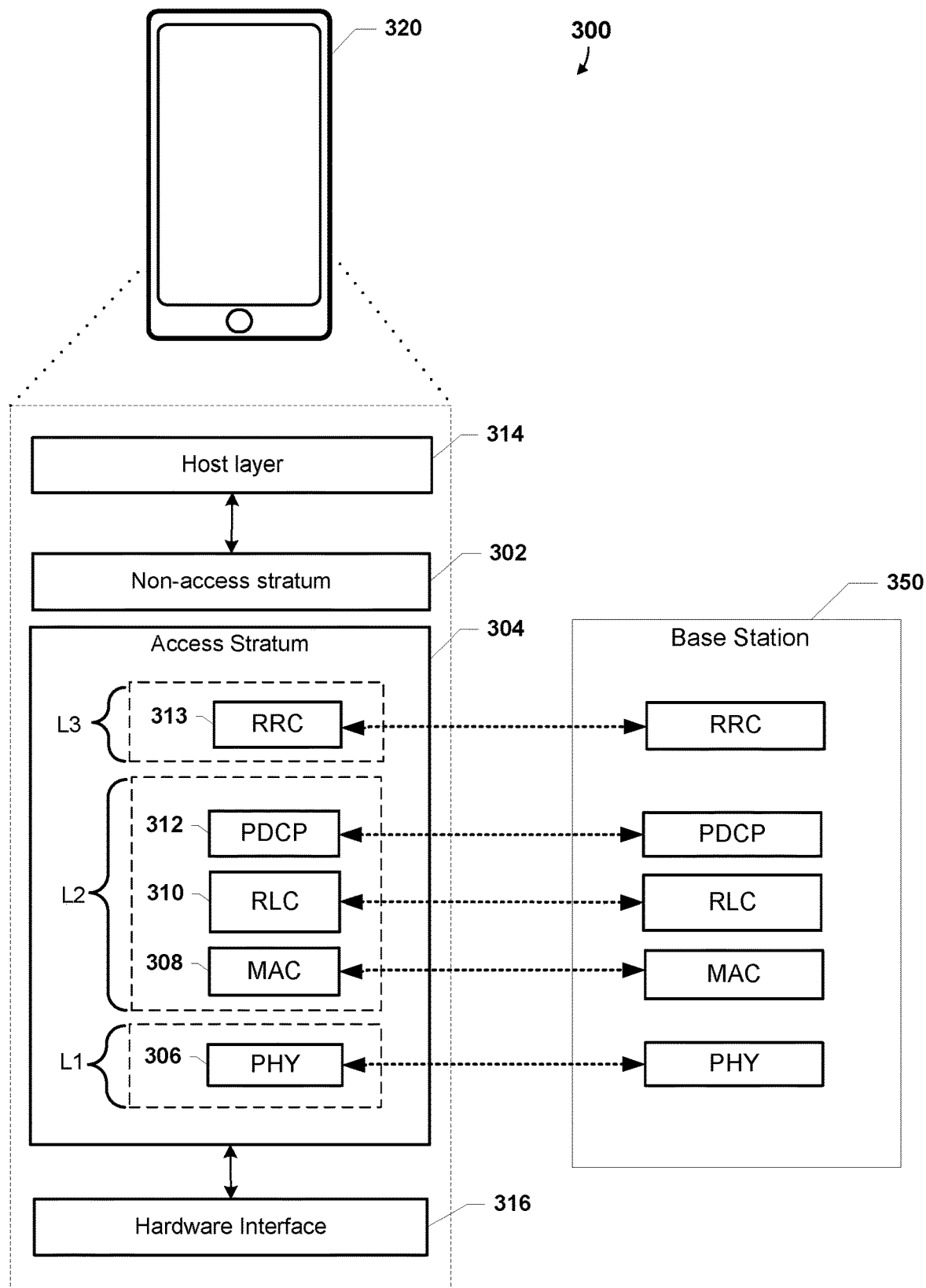
FIG. 3 is a diagram illustrating an example of a software architecture including a radio protocol stack for the user and control planes in wireless communications in accordance with various embodiments.

FIG. 3 illustrates an example of a software architecture 300 including a radio protocol stack for the user and control planes in wireless communications between a base station 350 (e.g., the base station 110a) and a computing device (UE computing device) 320 (e.g., the computing device 120a-120e, 200). With reference to FIGS. 1-3, the computing device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) computing device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the computing device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the computing device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the computing device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression. In various embodiments, the PDCP sublayer 312 encode TCP/IP packets for transmission via lower layers and/or decode TCP/IP packets received from low layers and destined for higher layers.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the computing device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
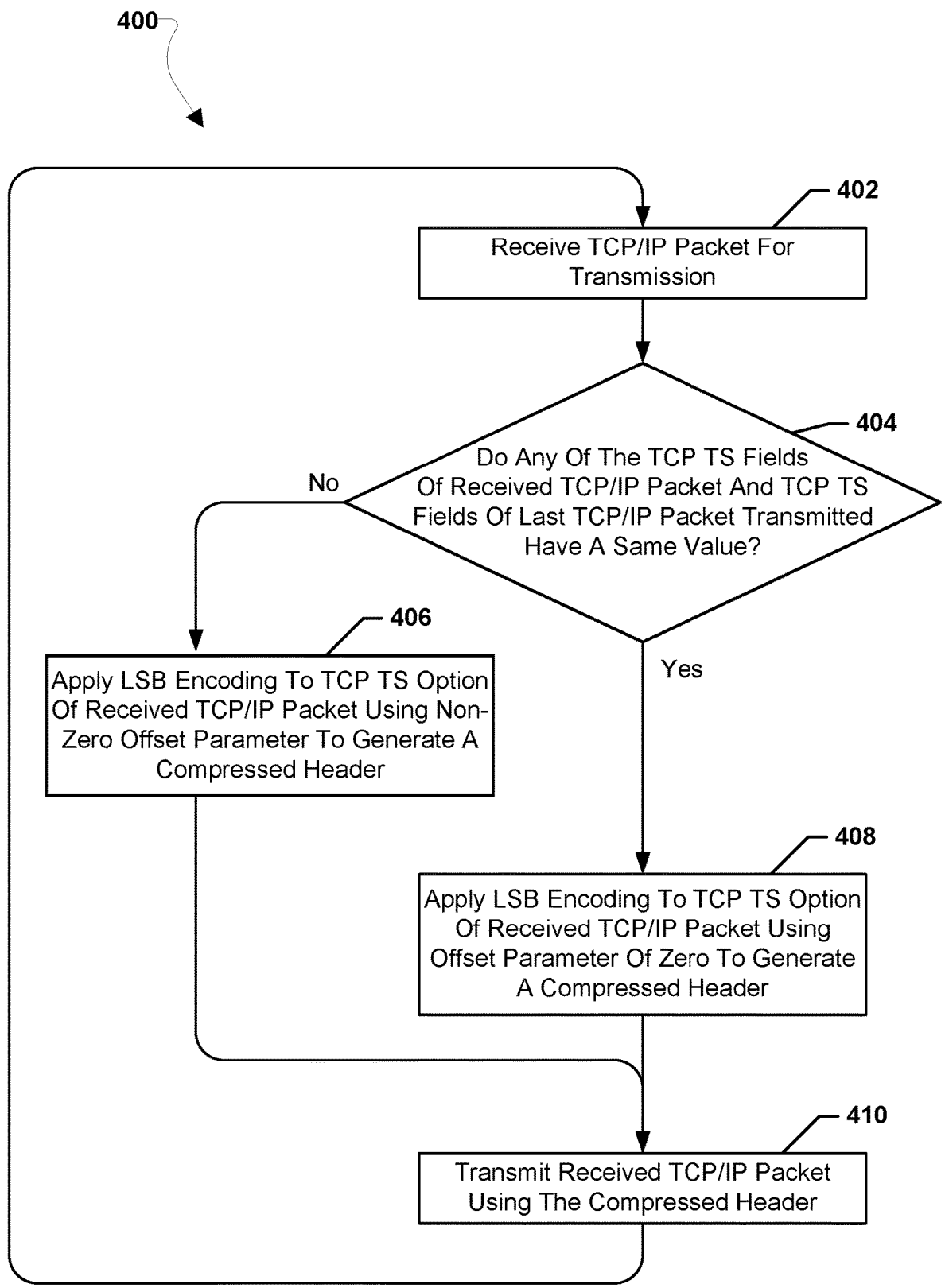
FIG. 4 is a process flow diagram illustrating a method for TCP/IP packet transmission according to an embodiment.

FIG. 4 shows a process flow diagram of an example method 400 for TCP/IP packet transmission according to various embodiments. With reference to FIGS. 1-4, the method 400 may be implemented by a processing device (such as 212, 216, 252 or 260) of a computing device (such as the computing device 120a-120e, 200, 320) and/or a processor of a base station (e.g., the base station 110a, 350). In various embodiments, the method 400 may be implemented by a PDCP layer (e.g., PDCP sublayer 312) running on a processing device of a computing device (such as the computing device 120a-120e, 200, 320) and/or a base station (e.g., the base station 110a, 350). For ease of reference, the hardware implementing the method 400 is referred to as the PDCP layer, meaning a processing device performing the method within that portion of the software architecture executing on the processing device in a computing device operating within a communication network as described herein.

In block 402, PDCP layer may receive a TCP/IP packet for transmission. The TCP/IP packet for transmission may be received from a higher layer of the software architecture and may be a TCP/IP to be transmitted from the computing device to another computing device over a wired or wireless link. For example, the TCP/IP packet may be a packet destined for a base station on the uplink when the computing device is a wireless device. As another example, the TCP/IP packet may be a packet destined for a computing device on the downlink when the computing device is a base station. In some embodiments, the TCP/IP packet may be a TCP/IP packet for retransmission in response to an indication that a retransmission request was received for a previously transmitted TCP/IP packet.

In determination block 404, the PDCP layer may determine whether a TCP TS field (i.e., TSVal or TSEcho) of the received TCP/IP packet and a TCP TS field of a last TCP/IP packet transmitted have a same value or remain constant. In some embodiments, a TCP TS field of the TCP/IP packet and a TCP TS field of a last TCP/IP packet transmitted may be determined to have a same value when one or both of the TSVal fields or the TSEcho fields of the TCP/IP packets are the same. Determining whether any of the TCP TS fields of the TCP/IP packets have the same value or are the same (i.e., remain constant from one TCP/IP packet to the next) may include performing any operations for determining whether the fields are the same or include a same value, such as comparing the fields, comparing hashes of the fields, subtracting values of the fields from one another such that non-zero results indicate a mismatch, etc.

In response to determining the TCP TS fields do not have a same value or are not the same (i.e., determination block 404="No"), the PDCP layer may apply LSB encoding to the TCP TS option of the received TCP/IP packet using a non-zero offset parameter to generate a compressed header in block 406. For example, window LSB encoding on 8 bits with p=−1 (i.e., offset parameter set to −1) may be applied to the TCP TS option of the received TCP/IP packet to generate a compressed header in block 406

In response to determining that any of the TCP TS fields in consecutive TCP/IP packets have a same value or are the same (i.e., determination block 404="Yes"), the PDCP layer may apply LSB encoding to the TCP TS option of the received TCP/IP packet using an offset parameter of zero to generate a compressed header in block 408. Thus, the offset parameter ("offset_param" or "p") may be set to zero (i.e., p=0 or offset_param=0) for LSB encoding of TSVal fields and/or TSEcho fields of TCP Timestamp option in response to a TCP TS field (i.e., TSVal or TSEcho) of the TCP/IP packet and a TCP TS field of a last TCP/IP packet transmitted have a same value, such as during retransmission of TCP/IP packets, during scenarios in which throughput is sufficiently high such that two or more packets are assigned the same timestamp, etc. The selection of p=0 may drive the "num_lsbs_param" (i.e., "k") to be equal to 0 (i.e., k=0) in LSB encoding. When p=0 and k=0, the encoding of the fields of the TCP TS option, i.e., TSVal field and/or TSEcho, can each be done using only 1 byte in various embodiments. In some circumstances, a TSVal field of the TCP TS option of the compressed header may have a size of one byte. In some circumstances, a TSEcho field of the TCP TS option of the compressed header may have a size of one byte. For example, if the processor determines that TSval remains constant between TCP/IP packets, the TSval may be compressed into one byte instead of three bytes, whereas if the TSecho is not constant, TSecho will be compressed accordingly.

In block 410, the PDCP layer may transmit the received TCP/IP packet using the compressed header. For example, the PDCP layer may transmit the received TCP/IP packet using the compressed header by passing the TCP/IP packet with the compressed header to a lower layer (e.g., an RLC layer, PHY layer, etc.) for transmission via a wired or wireless link to another computing device.

The method 400 may be repeated continuously, periodically or episodically as TCP/IP packets are received for transmission in block 402.

Figure 5:
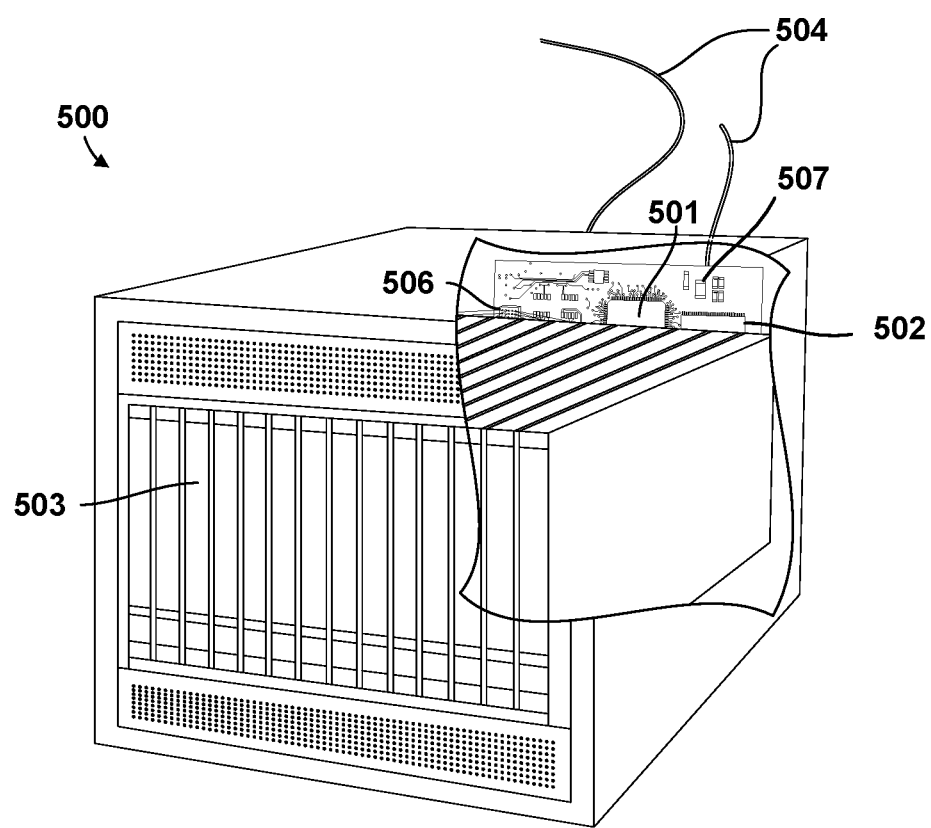
FIG. 5 is a component block diagram of a wireless router device suitable for TCP/IP packet transmission in accordance with various embodiments.

Various embodiments may be implemented on a variety of wireless network devices (e.g., base station 110a, 350), an example of which is illustrated in FIG. 5 in the form of a wireless network computing device 500 functioning as a network element of a communication network, such as a base station. Such network computing devices may include at least the components illustrated in FIG. 5. With reference to FIGS. 1-5, the network computing device 500 may typically include a processor 501 coupled to volatile memory 502 and a large capacity nonvolatile memory, such as a disk drive 503. The network computing device 500 may also include a peripheral memory access device such as a floppy disc drive, compact disc (CD) or digital video disc (DVD) drive 506 coupled to the processor 501. The network computing device 500 may also include network access ports 504 (or interfaces) coupled to the processor 501 for establishing data connections with a network, such as the Internet and/or a local area network coupled to other system computers and servers. The network computing device 500 may include one or more antennas 507 for sending and receiving electromagnetic radiation that may be connected to a wireless communication link. The network computing device 500 may include additional access ports, such as USB, Firewire, Thunderbolt, and the like for coupling to peripherals, external memory, or other devices.

Figure 6:
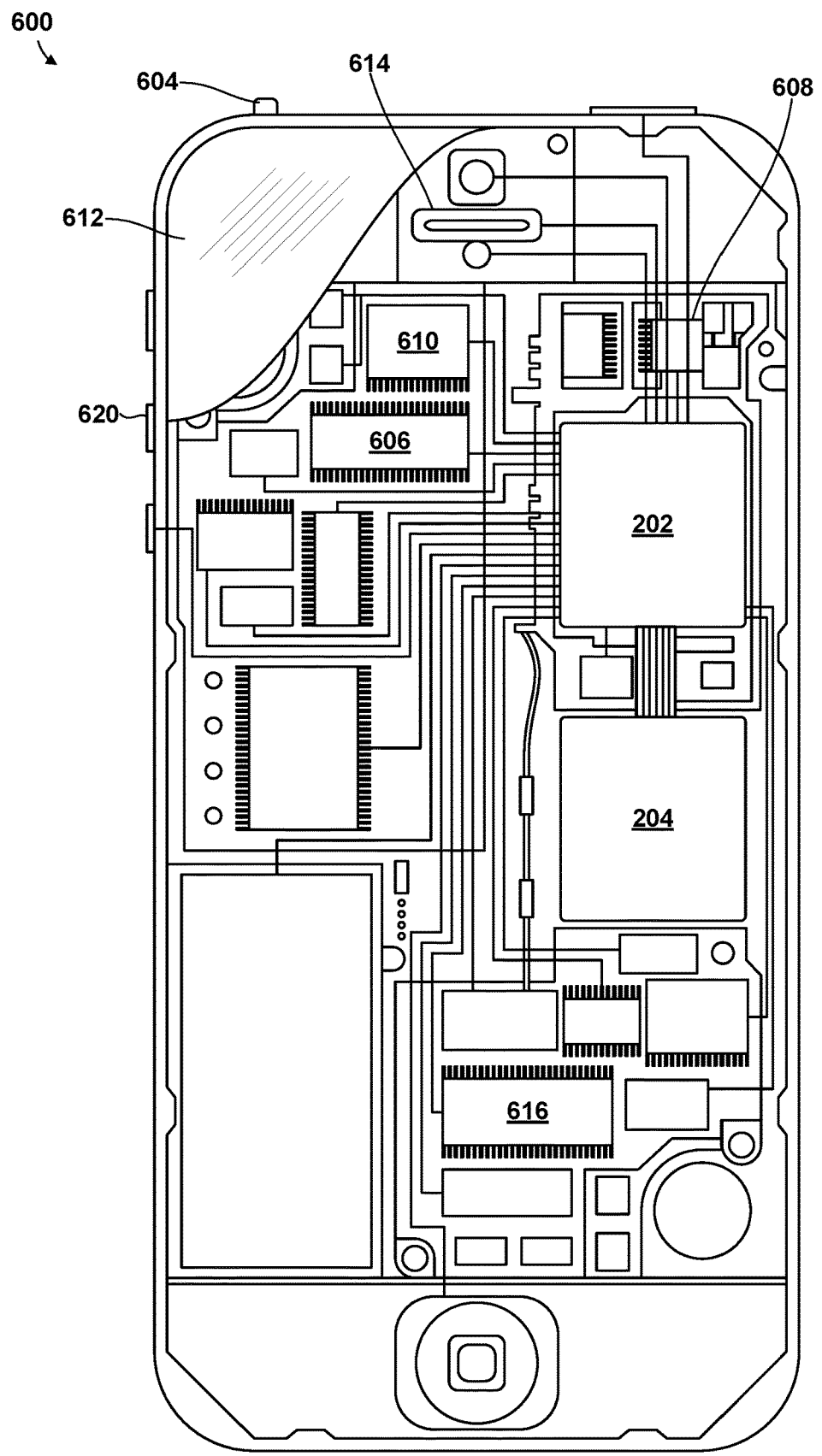
FIG. 6 is a component block diagram of a wireless communication device suitable for TCP/IP packet transmission in accordance with various embodiments.

Various embodiments may be implemented on a variety of computing devices (e.g., the computing device 120a-120e, 200, 320), an example of which is illustrated in FIG. 6 in the form of a smartphone 600. With reference to FIGS. 1-6, the smartphone 600 may include a first SOC 202 (e.g., a SOC-CPU) coupled to a second SOC 204 (e.g., a 5G capable SOC). The first and second SOCs 202, 204 may be coupled to internal memory 606, 616, a display 612, and to a speaker 614. Additionally, the smartphone 600 may include an antenna 604 for sending and receiving electromagnetic radiation that may be connected to a wireless data link and/or cellular telephone transceiver 608 coupled to one or more processors in the first and/or second SOCs 202, 204. Smartphones 600 typically also include menu selection buttons or rocker switches 620 for receiving user inputs.

A typical smartphone 600 also includes a sound encoding/decoding (CODEC) circuit 610, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 608 and CODEC 610 may include a digital signal processor (DSP) circuit (not shown separately).

The processors of the wireless network computing device 1700 and the smart phone 600 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 606, 616 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for Transmission Control Protocol (TCP)/Internet Protocol (IP) (TCP/IP) packet transmission performed by a packet data convergence protocol (PDCP) layer of a processing device, comprising:
applying least significant bit (LSB) encoding to a TCP Timestamp (TS) option of a TCP/IP packet using an offset parameter of zero to generate a compressed header in response to determining that a TCP TS field of the TCP/IP packet and a TCP TS field of a last TCP/IP packet transmitted have a same value, wherein a Timestamp Value (TSVal) field or a Timestamp Echo Reply (TSEcho) field of the TCP TS option of the compressed header has a size of one byte; and
transmitting the TCP/IP packet using the compressed header.

2. The method of claim 1, further comprising:
determining whether any of the TCP TS fields of the TCP/IP packet and the TCP TS fields of the last TCP/IP packet transmitted are the same; and
determining that a TCP TS field of the TCP/IP packet and a TCP TS field of the last TCP/IP packet transmitted have a same value in response to determining that the TCP TS field of the TCP/IP packet and the TCP TS field of the last TCP/IP packet transmitted are the same.

3. The method of claim 2, wherein determining whether any of the TCP TS fields of the TCP/IP packet and the TCP TS fields of the last TCP/IP packet transmitted are the same is based at least in part on whether a TSVal field of the TCP/IP packet and a TSVal field of the last TCP/IP packet are the same.

4. The method of claim 2, wherein determining whether any of the TCP TS fields of the TCP/IP packet and the TCP TS fields of the last TCP/IP packet transmitted are the same is based at least in part on whether a TSEcho field of the TCP/IP packet and a TSEcho field of the last TCP/IP packet are the same.

5. The method of claim 1, wherein the TSVal field of the TCP TS option of the compressed header has the size of one byte.

6. The method of claim 1, wherein the TSEcho field of the TCP TS option of the compressed header has the size of one byte.

7. An apparatus, comprising:
a processing device configured with processor-executable instructions to perform Transmission Control Protocol (TCP)/Internet Protocol (IP) (TCP/IP) packet transmission in a packet data convergence protocol (PDCP) layer, including performing operations comprising:
applying least significant bit (LSB) encoding to a TCP Timestamp (TS) option of a TCP/IP packet using an offset parameter of zero to generate a compressed header in response to determining that a TCP TS field of the TCP/IP packet and a TCP TS field of a last TCP/IP packet transmitted have a same value, wherein a Timestamp Value (TSVal) field or a Timestamp Echo Reply (TSEcho) field of the TCP TS option of the compressed header has a size of one byte; and
transmitting the TCP/IP packet using the compressed header.

8. The apparatus of claim 7, wherein the processing device is configured with processor-executable instructions to perform operations further comprising:
determining whether any of the TCP TS fields of the TCP/IP packet and the TCP TS fields of the last TCP/IP packet transmitted are the same; and
determining that a TCP TS field of the TCP/IP packet and a TCP TS field of the last TCP/IP packet transmitted have a same value in response to determining that the TCP TS field of the TCP/IP packet and the TCP TS field of the last TCP/IP packet transmitted are the same.

9. The apparatus of claim 8, wherein the processing device is configured with processor-executable instructions to perform operations such that determining whether any of the TCP TS fields of the TCP/IP packet and the TCP TS fields of the last TCP/IP packet transmitted are the same is based at least in part on whether a TSVal field of the TCP/IP packet and a TSVal field of the last TCP/IP packet are the same.

10. The apparatus of claim 8, wherein the processing device is configured with processor-executable instructions to perform operations such that determining whether any of the TCP TS fields of the TCP/IP packet and the TCP TS fields of the last TCP/IP packet transmitted are the same is based at least in part on whether a TSEcho field of the TCP/IP packet and a TSEcho field of the last TCP/IP packet are the same.

11. The apparatus of claim 7, wherein the processing device is configured with processor-executable instructions to perform operations the TSVal field of the TCP TS option of the compressed header has the size of one byte.

12. The apparatus of claim 7, wherein the processing device is configured with processor-executable instructions to perform operations the TSEcho field of the TCP TS option of the compressed header has the size of one byte.

13. An apparatus, comprising:
means for applying least significant bit (LSB) encoding to a Transmission Control Protocol (TCP)Timestamp (TS) option of a TCP/Internet Protocol (IP) (TCP/IP) packet using an offset parameter of zero to generate a compressed header in response to determining that a TCP TS field of the TCP/IP packet and a TCP TS field of a last TCP/IP packet transmitted have a same value, wherein a Timestamp Value (TSVal) field or a Timestamp Echo Reply (TSEcho) field of the TCP TS option of the compressed header has a size of one byte; and means for transmitting the TCP/IP packet using the compressed header.

14. The apparatus of claim 13, further comprising:
means for determining whether any of the TCP TS fields of the TCP/IP packet and the TCP TS fields of the last TCP/IP packet transmitted are the same; and
means for determining that a TCP TS field of the TCP/IP packet and a TCP TS field of the last TCP/IP packet transmitted have a same value in response to determining that the TCP TS field of the TCP/IP packet and the TCP TS field of the last TCP/IP packet transmitted are the same.

15. The apparatus of claim 14, further comprising means for determining whether any of the TCP TS fields of the TCP/IP packet and the TCP TS fields of the last TCP/IP packet transmitted are the same based at least in part on whether a TSVal field of the TCP/IP packet and a TSVal field of the last TCP/IP packet are the same.

16. The apparatus of claim 14, further comprising means for determining whether any of the TCP TS fields of the TCP/IP packet and the TCP TS fields of the last TCP/IP packet transmitted are the same based at least in part on whether a TSEcho field of the TCP/IP packet and a TSEcho field of the last TCP/IP packet are the same.

17. The apparatus of claim 13, wherein the TSVal field of the TCP TS option of the compressed header has the size of one byte.

18. The apparatus of claim 13, wherein the TSEcho field of the TCP TS option of the compressed header has the size of one byte.

19. A non-transitory processor-readable medium having stored thereon processor-executable instructions configured to cause a processing device of a computing device to perform operations for Transmission Control Protocol (TCP)/Internet Protocol (IP) (TCP/IP) packet transmission in a packet data convergence protocol (PDCP) layer, the operations further comprising:
applying least significant bit (LSB) encoding to a TCP Timestamp (TS) option of a TCP/IP packet using an offset parameter of zero to generate a compressed header in response to determining that a TCP TS field of the TCP/IP packet and a TCP TS field of a last TCP/IP packet transmitted have a same value, wherein a Timestamp Value (TSVal) field or a Timestamp Echo Reply (TSEcho) field of the TCP TS option of the compressed header has a size of one byte; and
transmitting the TCP/IP packet using the compressed header.

20. The non-transitory processor-readable medium of claim 19, wherein the stored processor-executable instructions are configured to cause the processing device to perform operations further comprising:
determining whether any of the TCP TS fields of the TCP/IP packet and the TCP TS fields of the last TCP/IP packet transmitted are the same; and
determining that a TCP TS field of the TCP/IP packet and a TCP TS field of the last TCP/IP packet transmitted have a same value in response to determining that the TCP TS field of the TCP/IP packet and the TCP TS field of the last TCP/IP packet transmitted are the same.

21. The non-transitory processor-readable medium of claim 20, wherein the stored processor-executable instructions are configured to cause the processing device to perform operations such that determining whether any of the TCP TS fields of the TCP/IP packet and the TCP TS fields of the last TCP/IP packet transmitted are the same is based at least in part on whether a TSVal field of the TCP/IP packet and a TSVal field of the last TCP/IP packet are the same.

22. The non-transitory processor-readable medium of claim 20, wherein the stored processor-executable instructions are configured to cause the processing device to perform operations such that determining whether any of the TCP TS fields of the TCP/IP packet and the TCP TS fields of the last TCP/IP packet transmitted are the same is based at least in part on whether a TSEcho field of the TCP/IP packet and a TSEcho field of the last TCP/IP packet are the same.

23. The non-transitory processor-readable medium of claim 19, wherein the stored processor-executable instructions are configured to cause the processing device to perform operations such that the TSVal field of the TCP TS option of the compressed header has the size of one byte.

24. The non-transitory processor-readable medium of claim 19, wherein the stored processor-executable instructions are configured to cause the processing device to perform operations such that the TSEcho field of the TCP TS option of the compressed header has the size of one byte.

* * * * *